(12) United States Patent
Nakai

(10) Patent No.: US 7,075,722 B2
(45) Date of Patent: Jul. 11, 2006

(54) DIFFRACTIVE OPTICAL ELEMENT AND OPTICAL SYSTEM HAVING THE SAME

(75) Inventor: Takehiko Nakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,587

(22) Filed: May 30, 2001

(65) Prior Publication Data

US 2002/0003661 A1    Jan. 10, 2002

(30) Foreign Application Priority Data

May 31, 2000 (JP) .............................. 2000-162572

(51) Int. Cl.
    *G02B 5/18* (2006.01)
(52) U.S. Cl. ...................................... 359/571; 359/569
(58) Field of Classification Search ................ 359/566, 359/569, 571, 576
    See application file for complete search history.

(56) References Cited

U.S. PATENT DOCUMENTS

| | | | |
|---|---|---|---|
| 5,015,835 A * | 5/1991 | Ohuchida et al. ......... 250/201.5 |
| 5,113,067 A | 5/1992 | Nakai et al. .............. 250/208.1 |
| 5,122,903 A | 6/1992 | Aoyama et al. ............ 359/565 |
| 5,278,817 A * | 1/1994 | Maeda et al. ........... 369/112.12 |
| 5,400,311 A * | 3/1995 | Komma et al. ........... 369/112.1 |
| 5,581,405 A | 12/1996 | Meyers et al. .............. 359/571 |
| 5,694,247 A * | 12/1997 | Ophey et al. ............... 359/566 |
| 5,742,433 A * | 4/1998 | Shiono et al. .............. 359/575 |
| 5,914,811 A | 6/1999 | Chen et al. ................. 359/495 |
| 5,956,302 A * | 9/1999 | Maeda et al. ............. 369/44.23 |
| 6,046,851 A | 4/2000 | Katayama ................... 359/486 |
| 6,292,297 B1 * | 9/2001 | Danziger et al. ........... 359/575 |
| 6,317,268 B1 | 11/2001 | Harrigan ..................... 359/649 |

FOREIGN PATENT DOCUMENTS

| | | |
|---|---|---|
| EP | 0 383 307 | 8/1990 |
| EP | 0 821 258 | 1/1998 |
| EP | 0 898 182 | 2/1999 |
| JP | 2-214372 | 8/1990 |
| JP | 10-39136 | 2/1998 |

OTHER PUBLICATIONS

Japanese Publication "KOGAKU", vol. 27, No. 1, pp. 12-17 (1998).
Japanese Publication "O plus E", vol. 21, No. 136, pp. 86-90 (Mar. 1991).
Japanese Publication "O plus E", vol. 21, No. 12, pp. 1554-1559 (Dec. 1999).
C. Londoño, et al., "The Design of Achromatized Hybrid Diffractive Lens Systems", SPIE-The International Society for Optical Engineering, International Lens Design Conference, vol. 1354, pp. 30-37 (Jun. 11-14, 1990).

* cited by examiner

*Primary Examiner*—Alessandro Amari
(74) *Attorney, Agent, or Firm*—Fitzpatrick, Cella, Harper & Scinto

(57) ABSTRACT

In a diffractive optical element and a polarization separation element using this diffractive optical element, incident light can be effectively separated for the respective polarization directions over the entire used wavelength range. The diffractive optical element is arranged such that the diffractive optical element has a grating structure in which at least two blazed type grating portions are successively arranged along a light traveling direction. Additionally, in at least one grating portion of the two blazed type grating portions, structures smaller than a used wavelength are arranged in a periodic manner.

6 Claims, 7 Drawing Sheets

DIFFRACTIVE OPTICAL ELEMENT AND OPTICAL SYSTEM HAVING THE SAME

BACKGROUND OF THE INVENTION

1. Field of the Invention

The present invention relates to a diffractive optical element and a polarization converting element using the diffractive optical element. The diffractive optical element is used under a plurality of wavelengths, or a plurality of band light. The diffractive optical element and polarization converting element are suitably employed in various sorts of optical appliances, for instance, an imaging optical system, a projection optical system (projector), an image processing apparatus, and a semiconductor manufacturing apparatus.

2. Related Background Art

Conventionally, diffractive optical elements may be used as diffractive lenses having purposes of reducing chromatic aberration, which is described in, for example, SPIE Vol. 1354 International Lens Design Conference (1990).

Also, diffractive optical elements may be used as color separation grating having purposes of performing color separations by utilizing different diffraction angles with respect to each of wavelengths, which is described in, for example, Japanese Patent Publication No. 5-46139.

Very recently, another diffractive optical element called as an SWS grating (Sub-wavelength structured grating) having a minute periodic structure, in which a grating period of a diffractive optical element is smaller than a used wavelength. A specific attention is paid to these SWS gratings which are disclosed in, for instance, Japanese publication "KOGAKU", volume 27, No. 1, published in 1998, on pages 12 to 17.

As to this SWS grating, it is known that such SWS gratings may own various functions such as a double refraction (birefringence) wavelength plate, an antireflection structure, and a polarization beam splitter, depending upon grating structures thereof. Then, as to these functions, various reports have been made in which there is a small optical performance variation caused by changes in incident angles of light beams entered into this SWS grating, and the SWS grating may have optically superior features.

Among these SWS gratings, as a diffractive optical element having a function of a polarization beam splitter, such a structure shown in FIG. 8 is disclosed in the publication "O plus E" Vol. 21, No. 136 (March in 1991), on pages 86 to 90, and also such a structure indicated in FIG. 9 is disclosed in the publication "O plus E" No. 12 (December in 1999), on pages 1554 to 1559.

In the diffractive optical element of FIG. 8, a portion of a grating period "Pt" is constituted by an SWS grating 5. The SWS grating 5 corresponds to a rectangular grating constituted by a material "n1" and a material "n2" of an element boundary. A grating period of a minute periodic structure is "p1", and an occupation ratio of the material "n2" occupied within an 1 period "P1" (namely, filling factor) is equal to "f1". Then, the SWS grating has a thickness "d1" on the side of the material n2, and a thickness "d2" on the side of the material n1.

Similarly, in the diffractive optical element of FIG. 9, a portion of a grating period Pt is constituted by the SWS grating 5. In this structure, a portion of a multiple layer film made of a material "n1" and another material "n2" is such an SWS grating constituted by a triangular grating, and is made in contact with another material "n3" at an element boundary.

In any of the diffractive optical elements shown in FIG. 8 and FIG. 9, an S-polarized light component is propagated as zero-order diffractive light along one direction, whereas a P-polarized light component is propagated in such a manner that this P-polarized light component is separated into two directions of (+) first-order diffraction light and (−) first-order diffraction light. This implies that the light amounts of emitted light beames are made approximately two times different from each other, depending upon the polarization directions. When these diffractive optical elements are applied to various fields as the polarization separation elements, the above-described propagation characteristics are not preferable.

Next, a polarization beam splitter 100 shown in FIG. 10 is well known in this field as a polarization separation element using a thin film. In this polarization separation element, a thin film is formed on a boundary surface 102 on which two sets of triangular cylinder prisms 101 are joined to each other, and incident light is caused to pass through the boundary surface, or to be reflected on this boundary surface, depending upon a polarization direction thereof, so that the polarized-light (beam) is separated.

In the case that each of the polarized light beams is entered at the designed incident angle, this incident polarized light beam may pass through the boundary surface, or may be reflected thereon with a transmittance or reflectance of alomost 100%. However, these polarization separation elements own such a drawback that when the incident angle thereof is shifted from the designed angle value by several degrees, the resultant polarization separation characteristic is considerably deteriorated.

Also, very recently, as a functional element to which a polarization separation element of a thin film is applied, such a polarization converting element 103 shown in FIG. 11 has been proposed in, for example, Japanese Laid-open Patent Application No. 10-39136.

When the structure is explained, a light beam "La" having random polarization directions, which is entered from an opening portion A1 provided on a light shielding member 6, is separated into a P-polarized light component and an S-polarized light component by a polarization separation thin-film 102.

The P-polarized light component passes through the polarization separation film 102, and thereafter the polarization direction of this P-polarized light component is converted into S-polarized light by a ½-wavelength plate 8 provided on the exit side, and then the S-polarized light component emerges therefrom.

On the other hand, after S-polarized light component is reflected by the polarization separation thin-film 102, the reflected S-polarized light component is again reflected by a reflection mirror 105, and then, the reflected polarized light maintaining the S-polarization emerges therefrom.

As a result, when the light beam La having the random polarization directions is entered into the polarization converting element 103, the light beam the polarization state of which is aligned as S-polarized light emerges therefrom.

This polarization converting element 103 is suitably employed so as to effectively illuminate such an element having a polarization characteristic as liquid crystal, while reducing a loss of a light amount.

However, this polarization converting element is manufactured as follows: That is, the polarization separation thin film 102 and the reflection mirror 105 are alternately overlapped with each other to be joined to the flat plate glass 104. The resultant element member is diagonally cut away, and the cut surfaces thereof are polished, and thereafter, the ½-wavelength plate 8 is adhered to a portion of this polished element member so as to manufacture the polarization converting element 103.

This manufacturing method requires very large numbers of manufacturing steps, and the very complex element is finally manufactured.

In the diffractive optical elements using the SWS grating in the conventional prior art mentioned above, since the light beam of the specific polarization direction is separated into the two different directions due to the structure thereof, there is a problem that the use efficiency of the light beam is lowered. On the other hand, the polarization separation element having the thin film has the following problems. That is, the incident angle characteristic of this polarization separation element is highly sensitive, and/or the manufacturing method of this polarization separation element is very complex.

The present invention has an object to provide a diffractive optical element and a polarization converting element with employment of such a diffractive optical element. That is, the diffractive optical element may be used in a similar manner to a polarization separation element having a thin-film structure, and while since a structure of an SWS grating is set in a proper manner, diffraction corresponding to each of polarization directions is effected only in a specific order.

Another object of the present invention is to provide a diffractive optical element and a polarization converting element with employment of this diffractive optical element, which has an SWS grating structure manufactured under better condition, and is capable of separating polarized light.

SUMMARY OF THE INVENTION

To achieve the above-described objects, a diffractive optical element according to an aspect of the present invention is featured by such a diffractive optical element wherein: the diffractive optical element has a grating structure in which at least two blazed type grating portions are overlapped with each other, and in at least one grating portion of the two blazed type grating portions, structures smaller than a used wavelength are arranged in a periodic manner on all of the light incident surfaces thereof.

A diffractive optical element according to another aspect of the present invention, is featured by that the diffractive optical element is structured such that within an entire region of used wavelengths, diffraction directions are made different from each other, depending upon a polarization direction of a light beam incident on the diffractive optical element, and a diffracted light is concentrated only to one predetermined diffraction order.

A diffractive optical element according to another aspect of the present invention is featured by that the the minute periodic structure is constituted by one kind of material, or two kinds of materials, and occupation ratios of the respective materials within one period of the minute periodic structure are made different from each other along a periodic direction of the grating portion.

A diffractive optical element according to another aspect of the present invention is featured by that the diffractive optical element has a step-shaped grating portion.

A diffractive optical element according to another aspect of the present invention is featured by that the minute periodic structure of the grating portion is varied along the periodic direction of the grating portion.

A diffractive optical element according to another aspect of the present invention is featured by that minute periodic structure varied along the periodic direction of the grating portion is varied every step of the grating stepped portions.

A diffractive optical element according to another aspect of the present invention is featured by that the minute periodic structure of the grating portion is varied in a grating thickness direction.

A diffractive optical element according to another aspect of the present invention is featured by that the minute periodic structure varied in the grating thickness direction is varied every step of the grating stepped portion.

A diffractive optical element according to another aspect of the present invention is featured by that the used wavelength range corresponds to a visible light range.

Also, a polarization converting element according to another aspect of the present invention is featured by such a polarization converting element, deflecting means is provided so that an emergence direction of one of a P-polarized light beam and an S-polarized light beam which has undergone polarization-separation to be diffracted in a diffraction direction different depending on a polarization direction by the diffractive optical element of the aforementioned aspects of the invention is made substantially coincident with an emergence direction of the other beam.

A polarization converting element according to another aspect of the present invention is featured by that a half-wave plate is provided in correspondence to one of a P-polarized light beam and an S-polarized light beam, which has undergone polarization-separation to be diffracted in a direction different depending upon polarization direction, by the diffractive optical element.

A polarization converting element according to another aspect of the present invention is featured by that deflecting means is provided so that an emergence direction of one of a P-polarized light beam and an S-polarized light beam which has undergone polarization-separation to be diffracted in a diffraction direction different depending on a polarization direction by the diffractive optical element is made substantially coincident with an emergence direction of the other beam and a half-wave plate is provided in correspondence to one of the P-polarized light beam and S-polarized light beam.

A polarization converting element according to another aspect of the present invention is featured by that an optical member is provided so that an incident direction of a light beam on the diffractive optical element is made substantially parallel to an emergence direction thereof.

Also, a projection type display apparatus according to a further aspect of the present invention is featured by such a projection type display apparatus, a light beam which is emitted from a light source unit and contains an S-polarized light component and a P-polarized light component, is guided using the polarization converting element of the aforementioned aspects of the invention toward modulating means for modulating the light beam on the basis of an image signal and the light beam modulated by the modulating means is projected onto a predetermined surface by a projection optical system.

A projection type display apparatus, according to a still further aspect of the present invention, is featured by that the image signal is controlled in response to a signal supplied from an image processing means.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, various preferred embodiments of the present invention will be descrbied in detail.

Embodiment 1

Figure 1:
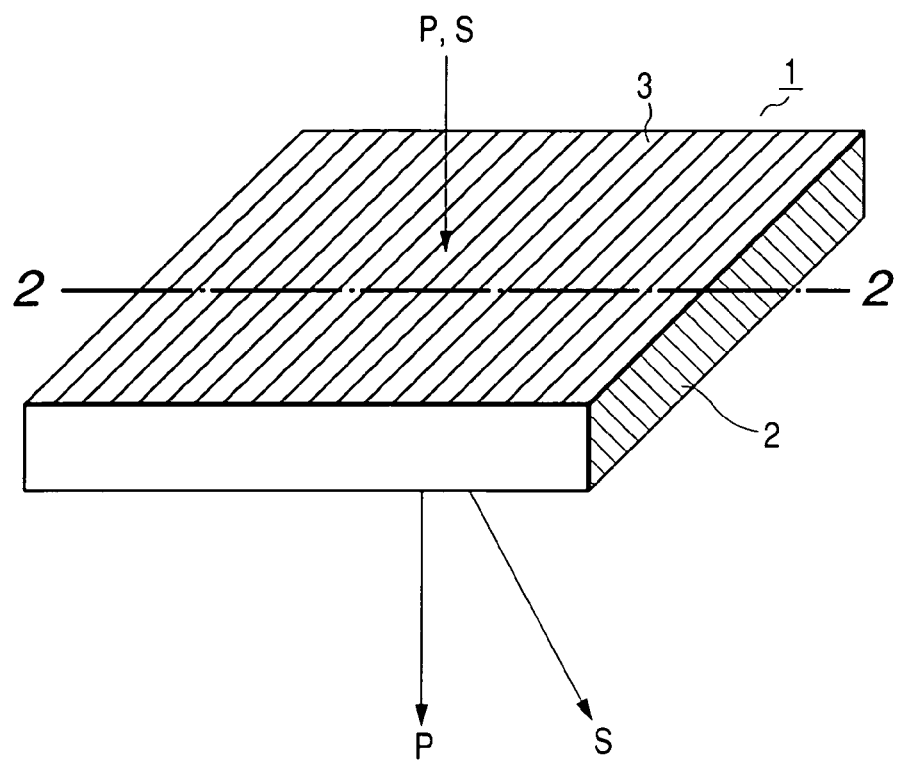
FIG. 1 is a perspective view for representing a diffractive optical element according to an embodiment 1 of the present invention.

FIG. 1 is a perspective view for indicating a diffractive optical element which performs a polarization separation operation, according to an embodiment 1 of the present invention.

In the diffractive optical element 1 for performing the polarization separation operation, a diffraction grating 3 capable of performing the polarization separation operation is provided on a substiate 2.

The diffraction grating 3 is constituted by a one-dimentional blazed type grating shape, and has a grating period "Pt" along a direction of 2—2 shown in this drawing. In the diffractive optical element 1, diffraction directions of light beams incident on diffractive optical element 1 are made different from each other, depending upon polarization directions thereof. Further, this diffraction grating 3 is set in such a manner that each of polarized lights is diffracted only at a specific diffraction order.

Figure 2:
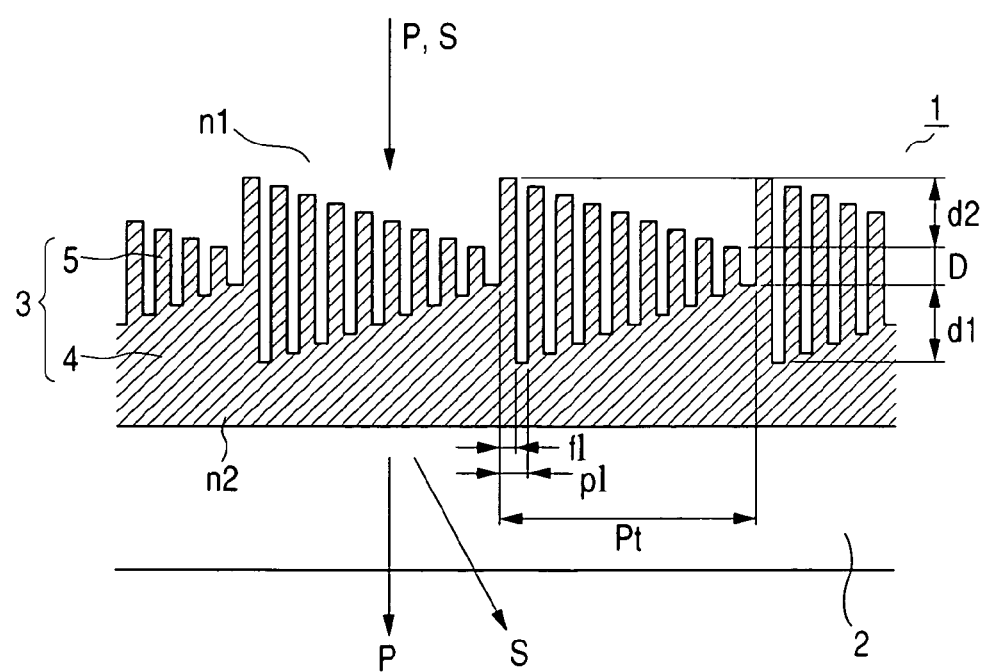
FIG. 2 is an explanatory diagram for explaining a sectional shape of the diffractive optical element according to the embodiment 1 of the present invention.

FIG. 2 is an explanatory diagram for explaining a portion of a sectional shape of the diffractive optical element 1 of FIG. 1, cut away at the line 2—2 of FIG. 1.

A sectional grating shape of the diffraction grating 3 which constitutes the diffractive optical element 1 according to the present invention is arranged by a blazed type first diffraction grating portion 4 which is provided on the substrate 2, and by a blazed type second diffraction grating portion 5 which is formed on the first diffraction grating portion 4.

Then, as to any one of these diffraction grating portions (for example, second diffraction grating portion 5 shown in this drawing), an entire surface of light incident surface of this diffraction grating portion is constituted by an SWS grating (Sub-Wavelength structured grating) which has a minute periodic structure which is smaller than a wavelength of light under use.

Then, all of the first and second diffraction grating portions 4 and 5 may function as such a diffractive optical element that executes a single polarization separating operation.

Furthermore, a supplementary explanation will now be made of the shape of the above-described diffraction grating 3. The diffraction grating 3 formed on the substrate 2 is formed at a boundary between a material $n1(\lambda)$ and another material $n2(\lambda)$. The first diffraction grating portion 4 is made of the material $n2(\lambda)$, and corresponds to an one-dimensional diffraction grating portion having a sawtooth shape, the grating pitch of which is "Pt" and the grating thickness of which is "d1."

One the other hand, the second diffraction grating portion 5 has an SWS grating structure in which the material $n1(\lambda)$ and the material $n2(\lambda)$ are alternatively repeated with a minute period smaller than the wavelength of the light used. The grating pitch of the SWS grating is "P1", and an occupation ratio of the material $n2(\lambda)$ which is occupied within the grating pitch "P1" is equal to F=f1/P1 (will be referred to as a "filling factor" hereinafter).

The shape of this second diffraction grating portion 5 is such a one-dimensional rectangular grating shape having a period parallel to the grating pitch "Pt" of the first diffraction grating portion 4.

Then, the grating thickness of this SWS grating is varied from a thickness of (d1+D+d2) to another thickness of (D) in a monotone mode along a periodic direction, and this thickness change is repeated with the period of the above-explained grating pitch "Pt".

In this embodiment 1, both the grating pitch "p1" and the filling factor "F" of the SWS grating are always constant value.

Next, the structure of the diffractive optical element according to this embodiment 1 will now be described based upon concrete numerical values. In order that a minute periodic structure acts as an SWS grating, the period must be sufficiently made smaller with respect to a used wavelength.

Concretely speaking, this aspect will now be explained with employment of a diffraction formula (1):

$$n2(\lambda)\sin\theta_2 - n1(\lambda)\sin\theta_1 = m\lambda/p1 \qquad (1)$$

In this formula (1), symbols $n1(\lambda)$ and $n2(\lambda)$ indicate refractive indexes of materials (qualities of used members) at light incident side/light exit side in the diffractive optical element, symbol "$\theta_1$" shows an incident angle of a light beam, symbol "$\theta_2$" indicates an exit angle (diffraction angle) of the light beam, symbol "m" represents a diffraction order, symbol "$\lambda$" shows a used wavelength, and symbol "p1" denotes a period (pitch) of a minute periodic structure.

In such a case that a diffractive optical element is applied to a part of an optical system, it is preferable to select a pitch "p1" that only zero-order diffraction light as a light traveling therefrom can be established.

This supplementary explanation will now be made by employing a simple numerical example. Assuming now that the used wavelength is selected to be 400 nm, the refractive index "n1" of the material of the light incident side under used wavelength is equal to 1.0, whereas the refractive index "n2" of the material of the light exit side is equal to 1.5.

The following case is considered: A light beam is entered into the minute periodic strucuture of this diffractive optical element from the vertical direction (θ1=0). In the case that m=1 and the light exit angle "θ2" is selected to be 90°, the period "p1" of the minute periodic structure is equal to 0.27 µm based upon the above-explained formula (1).

As a consequence, under such a condition that the grating pitch "p1" is smaller than, or equal to 0.27 µm, since there is no solution as to this formula (1) due to the minute periodic structure, only diffracted light does not appear.

As a consequence, the propagated or traveled light beam is only zero-order diffraction light with respect to the minute periodic structure.

A diffraction formula of the zero-order diffraction light corresponds to "m=0" in the formula (1), which is equivalent to the formula with respect to the Snell's law of refraction.

Since such a condition is established, the minute periodic structure may have the form birefringence corresponding to the specific characteristic as the SWS grating. In other words, with respect to an optical wave which is entered into the second diffraction grating portion 5, a refractive index of an optical wave which is vibrated in parallel to an extension direction of the minute periodic structure (namely, will be referred to as "P-polarized light" hereinafter) is made different from a refractive index of an optical wave which is vibrated perpendicular to this extension direction (namely, will be referred to as "S-polarized light" hereinafter). The second diffraction grating portion 5 may be functioned as different diffraction gratings with respect to the P-polarized light and the S-polarized light. As a consequence, in such a case that the first diffraction grating portion 4 is combined with the second diffraction grating portion 5 and then the combined diffraction grating portions 4 and 5 are optimized, such a polarization separation operation may be obtained as follows: That is, the P-polarized light travels straight on as zero-order diffraction light, whereas the S-polarized light is diffracted as first-order diffraction light to one given direction. Also, since this condition is established, no diffraction occurs in the SWS grating. As a result, considering such a case that a diffraction separation operation is performed as the diffractive optical element capable of performing the polarization separation operation, no care is taken into the occurrence of diffraction in the minute periodic structure.

As previously explained, as to the diffractive optical element having the minute periodic structure and capable of performing the polarization separation, in order that the period (pitch) of the minute periodic structure can satisfy the above-described conditions, the minute period must be determined in such a manner that this condition can be satisfied within the range of the range of the used incident angle over the entire region of wavelengths used.

Figure 3:
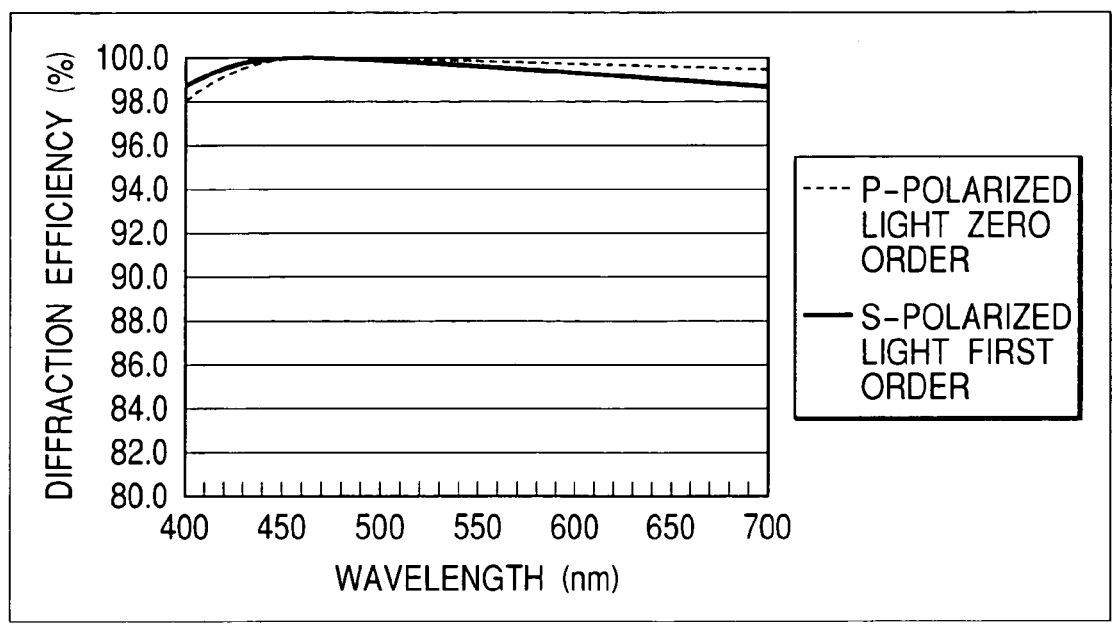
FIG. 3 is an explanatory diagram for explaining a diffractive efficiency of the diffractive optical element of the embodiment 1 with respect to each polarized light.

FIG. 3 represents a polarization separation characteristic which is achieved by the polarization separation element having the above-explained minute periodic structure.

This embodiment is arranged as follows: That is, the P-polarized light component of the incident light beam is separated as the zero-order diffraction light of the one-dimensional diffractive optical element constituted by the grating pitch "Pt", and the S-polarized light component of the incident light beam is separated as the first-order diffraction light.

It is so assumed that while the period "p1" of the minute periodic structure is selected to be 0.2 µm and the filling factor "F" is selected to be 0.56, the material 1 is made of air, and the material 2 is made of ultraviolet hardening resin (nd=1.6363, vd=22.8).

The grating thickness d1 is 2.32 µm, the grating thickness d2 is 3.88 µm, and the thickness D is 0.5 µm.

It can be seen from this polarization separation characteristic that both the P-polarized light component and the S-polarized light component can own better characteristics higher than, or equal to approximately 98% over the visible light range.

In the above-explained structure, the diffraction grating 3 is provided on the substrate 2. Alternatively, a substrate made of a quartz is employed, and a shape may be directly formed on the substrate by way of an etching treatment using the quartz substrate and the like. In this alternative case, if it is so regarded that the material 1 (air) is equal to an outer atmosphere, then an essential material may be realized only by one sort of quartz.

Also, in the above-explained embodiment, the period of the minute periodic structure is set in parallel to the period of the diffraction grating portion. Alternatively, the present invention is not limited to this structure, but may be realized by that the period of the diffraction grating portion may be set perpendicular to the period of the minute periodic structure.

Embodiment 2

Figure 4:
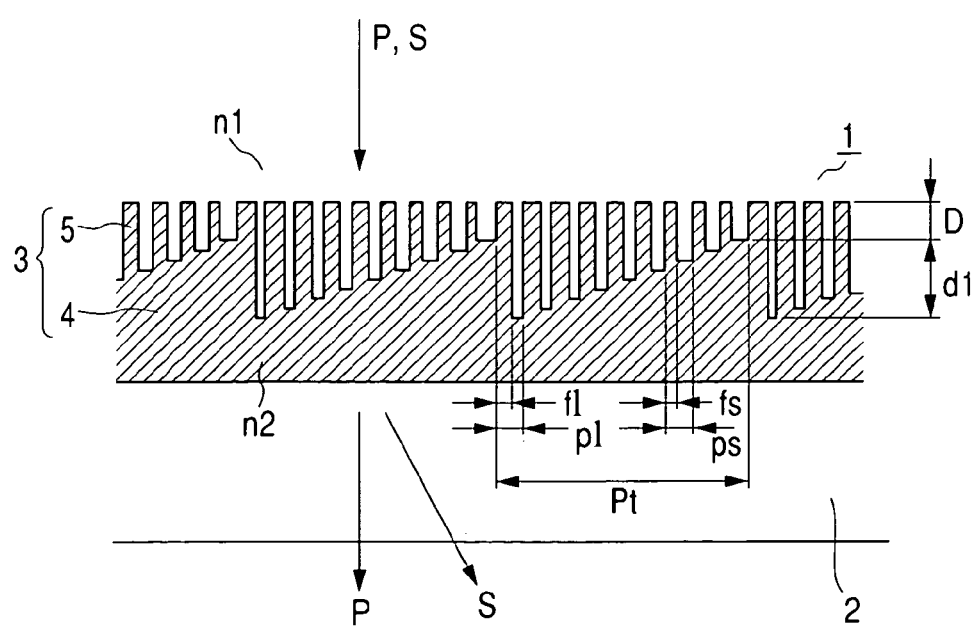
FIG. 4 is an explanatory diagram for explaining a sectional shape of a diffractive optical element according to an embodiment 2 of the present invention.

FIG. 4 is a sectional view for showing a major structure of a diffractive optical element according to an embodiment 2 of the present invention. The diffractive optical element of this embodiment 2 is featured by such a structure that an edge surface of a minute periodic grating provided on a light incidence side is matched with a grating periodic direction in parallel with each other.

In the embodiment 1, both the grating pitch "P1" of the minute periodic structure and the filling factor F=f1/P1 have the constant values.

To the contrary, in the embodiment 2, a filling factor Fs=Ps/fs is changed with the grating pitch "Pt" of the second diffraction grating portion 5 in order to make the edge surfaces parallel to each other.

Concretely speaking, a value of a filling factor is made larger at the deeper portion in the SWS grating, whereas a value of a filling factor is made smaller or at the thinner in the SWS grating.

In this drawing, the structure of this diffractive element is made of 9 sets of minute gratings within the grating pitch "Pt". As a consequence, the above-explained relationship may be expressed as:

$$F1>F2>F3>F4>F5>F6>F7>F8>F9, Fs; 1 \leq s \leq 9.$$

In other words, as to the deep SWS grating, since a ratio of a material 2 becomes large with respect to air of a material 1, an apparent refractive index is approximated to the material 2. When the air ratio of the material 2 is made equal to the air ratio of the material 1, the resulting refractive index becomes large, as compared with the case that the filling factor is Fs=0.5.

On the other hand, as to the thin SWS grating, since a ratio of a material 2 becomes small with respect to air of a material 1, an apparent refractive index is approximated to air of the material 1. When the air ratio of the material 2 is made equal to the air ratio of the material 1, the resulting refractive index becomes small as compared with the case that the filling factor is Fs=0.5.

As a result of this effect, the grating thickness of the deep grating can be made relatively thinner. Since the filling factors are optimized, such a structure can be made that the edge surface of the minute periodic grating formed on the light incidence side is matched with the grating periodic direction in parallel to each other. As to this structure, in such a case that the SWS grating is formed by way of an etching treatment, since an etching mask may be close-contacted thereto, the minute periodic structure having the superior performance can be manufactured.

In this embodiment 2, the grating pitch of the SWS grating may be gradually changed. The grating pitch is made larger within a range where the SWS grating can be established along such a direction that the grating becomes thinner, so that it is possible to suppress such a condition that the absolute width of the material 2 of the rectangular grating becomes narrow. This is very preferable in view of the manufacturing aspect.

Embodiment 3

Figure 5:
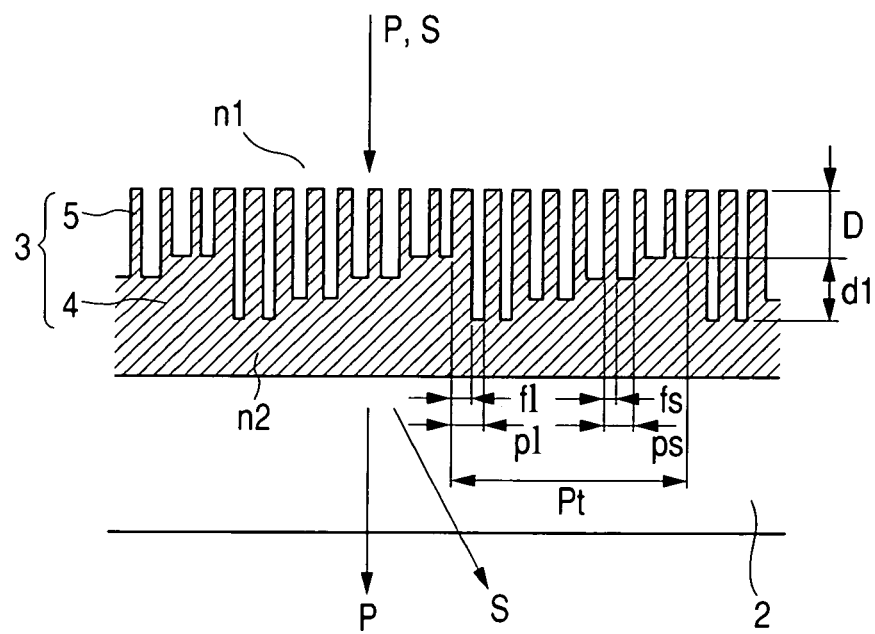
FIG. 5 is an explanatory diagram for explaining a sectional shape of a diffractive optical element according to an embodiment 3 of the present invention.

FIG. 5 is a schematic diagram for indicating a major portion of a diffractive optical element according to a third embodiment of the present invention.

The diffractive optical element of this third embodiment is featured by that the grating shape of the first diffraction grating portion 4 according to the embodiment 2 is made in a stepped grating. Also, a filling factor Fs of an SWS grating along a grating periodic direction is changed in response to the step configuration. In this drawing, the diffractive optical element is arranged in such a manner that 8 sets of minute gratings are provided within the grating pitch Pt. Also, the stepped grating has four stages of stepped shapes.

As a consequence, the above-explained relationship may be expressed as follows:

F1=F2>F3=F4>F5=F6>F7=F8, Fs; 1≦s≦8.

With employment of this structure, if four kinds of masks are employed, then the diffractive optical element may be manufactured by way of an etching technique in a relatively simple manner.

Figure 6:
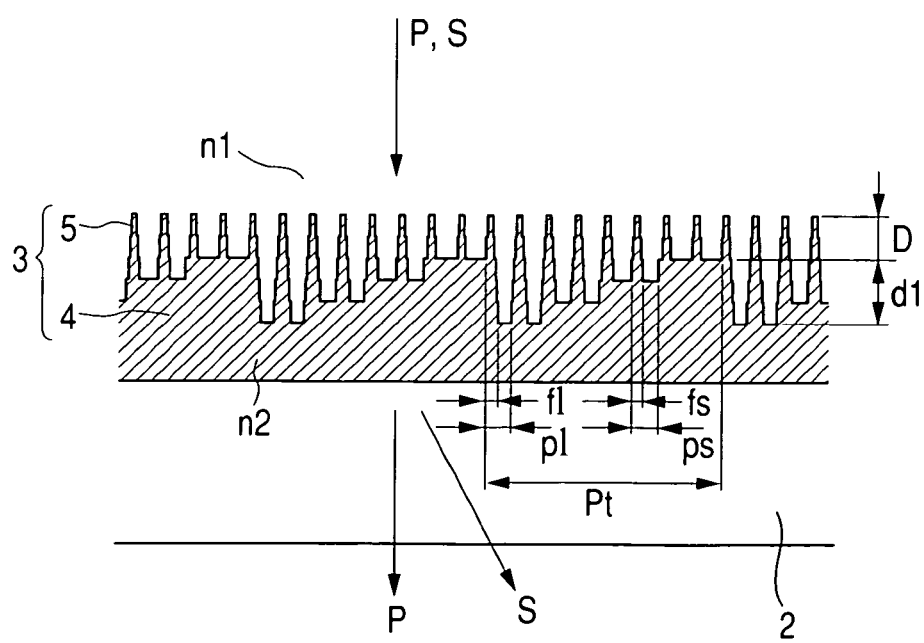
FIG. 6 is an explanatory diagram for explaining a sectional shape of another diffractive optical element according to the embodiment 3 of the present invention.

Furthermore, as indicated in FIG. 6, the filling factor Fs is not changed along the above-explained grating periodic direction in correspondence with the stepped shape, but the filling factor may be changed along the depth direction.

In FIG. 6, Fs corresponds to an occupation ratio of the material 2 within the grating pitch Ps.

The filling factor Fs is changed as 2 stages, 3 stages, - - -, n stages in response to the depth, while the stepped grating is set along the height direction (depth direction).

Embodiment 4

Figure 7:
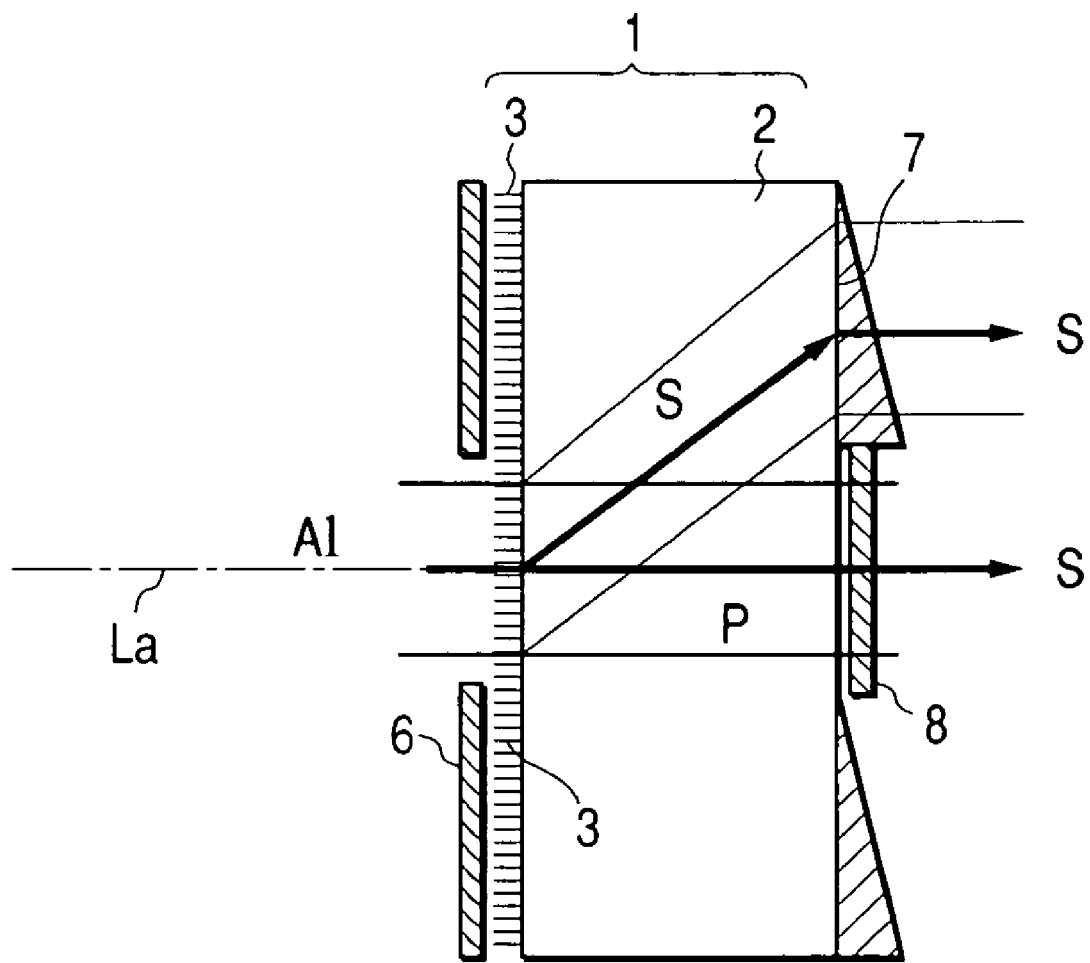
FIG. 7 is an explanatory diagram for explaining a polarization converting element according to an embodiment 1 of the present invention.
Figure 8:
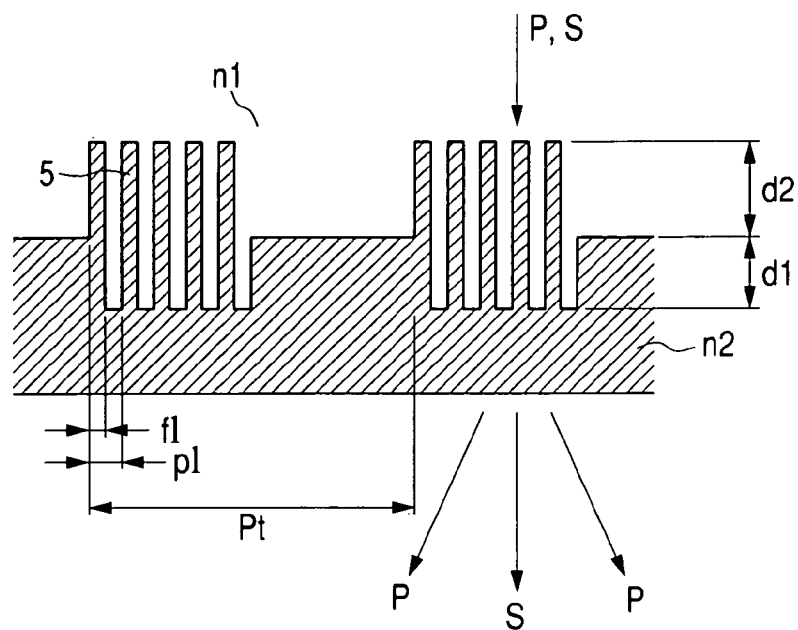
FIG. 8 is an explanatory diagram for explaining a sectional shape of one polarized light separating type diffractive optical element of the prior art.
Figure 9:
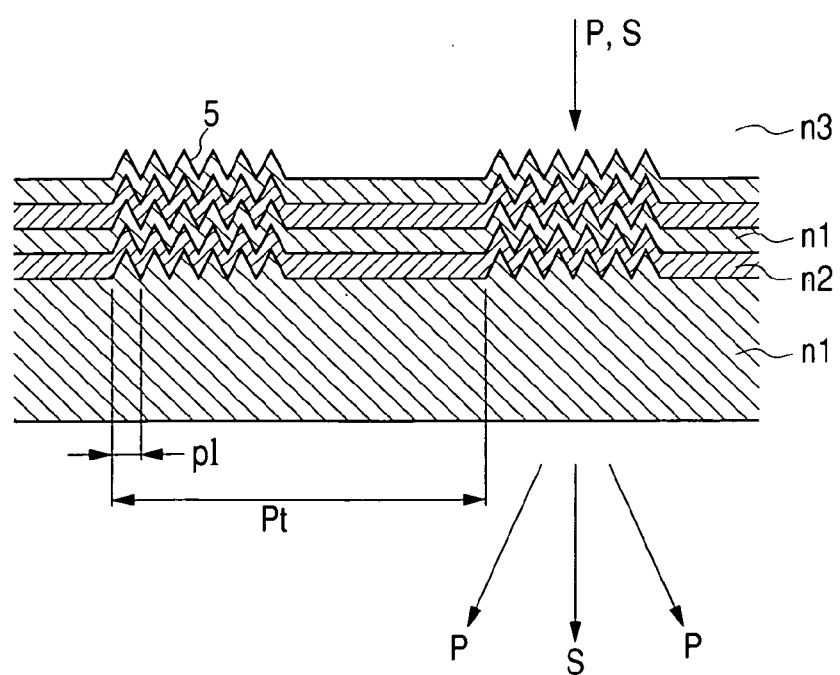
FIG. 9 is an explanatory diagram for explaining a sectional shape of another polarized light separating type diffractive optical element of the prior art.
Figure 10:
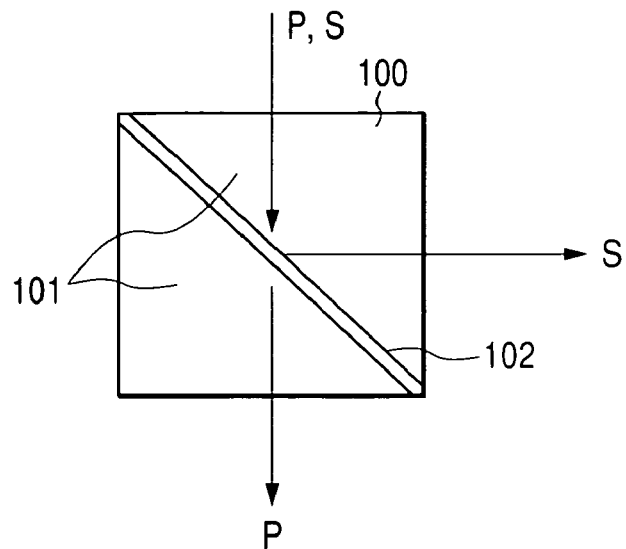
FIG. 10 is an explanatory diagram for explaining a sectional shape of the thin-film polarization beam splitter of the prior art.
Figure 11:
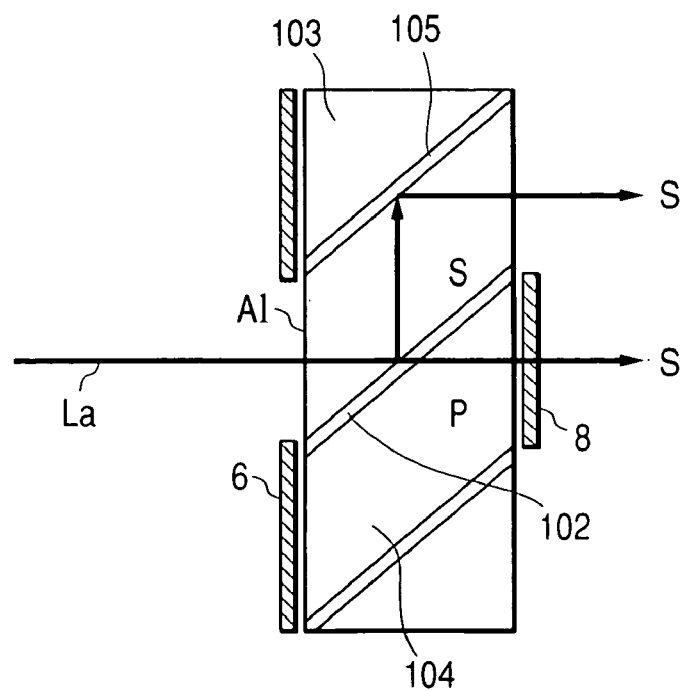
FIG. 11 is an explanatory diagram for explaining the polarization converting element of the prior art.

FIG. 7 is an explanatory diagram for explaining a structure of a polarization converting element, according to an embodiment 1, by using the diffractive optical element for performing the polarization separation of the present invention.

In FIG. 7, a light beam "La" having random polarization direction is incident on a diffraction grating 3 formed on a substrate 2. The light beam "La" is entered from an opening portion A1 formed in a light shielding member 6.

In the diffractive optical element which performs the polarization separation, a P-polarized light component "P" is not diffracted so that zero-order diffraction light, travels straight on, whereas an S-polarized light component "S" is diffracted/separated as first-order diffraction light.

After the P-polarized light component has passed through the diffractive optical element 1, the polarization direction of this P-polarized light component is converted into on S-polarized component by a ½-wavelength plate 8 provided on the exit side, and then the S-polarized light component is emerges therefrom.

On the other hand, after the S-polarized light component is diffracted by the diffraction grating 3, the diffracted S-polarized light component is deflected by a prism 7 so as to emerge as S-polarized light component therefrom toward the same direction as the light beam passing through the ½-wavelength plate 8.

Accordingly, when the light beam La having the random polarization directions enters into the diffractive optical element, the light beam the polarization direction of which has become uniform emerges as S-polarized light therefrom.

Further, in the above-explained structure, when the prism (deflecting means) 7 is manufactured in a grating shape and also the ½-wavelength plate 8 is formed by changing the grating structure of the SWS grating, this structure may be preferably manufactured by way of the same manufacturing method as that of the diffractive optical element 1.

In this embodiment 4, the emergence direction of any one of the light beames, namely either the P-polarized light light beam or the S-polarized light light beam which is diffracted in a given direction depending on the polarization direction and separated from the other polarized light beam is made coincident with the emergence direction of the other S-polarized light or P-polarized light.

Also, the deflecting means 7 has a function of an optical member by which the incident direction of the light beam incident on the diffractive optical element 1 is made substantially parallel to the emergence direction thereof.

As previously explained, each of the diffractive optical elements, according to the respective embodiments, is arranged in such a manner that this diffractive optical element has the grating structure in which at least two kinds of diffraction gratings are overlapped with each other, and also at least one kind of diffraction grating portion of these diffraction gratings has the minute periodic structure smaller than the used wavelength, so that the diffraction direction differs depending upon the polarization direction of the light beam incident on the diffractive optical element and each of the polarized light beam incident thereon is diffracted at only a predetermined diffraction order, within the entire range of these used wavelengths.

Also, each of the diffractive optical elements, according to the respective embodiments, may be used in the similar utilization field to the conventional thin-film, and also the superior incident angle characteristic owned by the SWS grating itself may be effectively utilized.

Also, when each of the diffractive optical elements, according to the respective embodiments, is applied to the polarization converting element, it is possible to realize such a high-precision polarization converting element having a simple structure.

Figure 12:
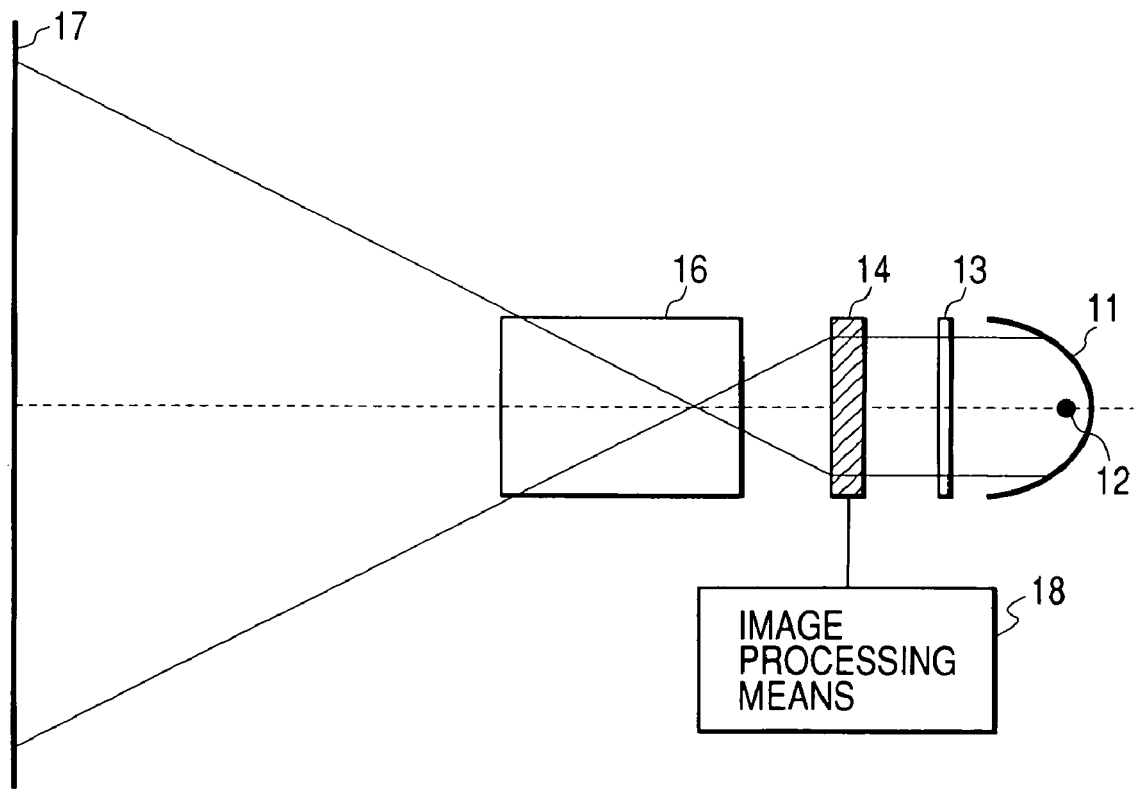
FIG. 12 is a schematic diagram for representing a major structure of a projection apparatus with employment of the diffractive optical element of the present invention.

FIG. 12 is a schematic diagram for representing a major arrangement of a projection apparatus with employment of the polarization converting element according to the present invention.

In FIG. 12, symbol 12 indicates a light source unit which emits a light beam containing an S-polarized light component and a P-polarized light component.

Also, reference numeral 11 indicates a reflection mirror. The reflection mirror 11 reflects the light beam emitted from the light source unit 12 toward a direction opposed to the polarization converting element 13 side.

The polarization converting element 13 has the structure as previously explained in FIG. 7. This polarization converting element 13 causes the light beam emitted from the light source unit 12 to emerge as a light beam having any one of the polarization directions which are S-polarized state and P-polarized state. Reference numeral 14 represents an optical modulating means (liquid crystal panel) comprising a liquid crystal display (LCD) device which modulates the light emerging from the polarization converting element 13 on the basis of a supplied image signal.

Also, reference numeral 16 shows a projection optical system. The projection optical system 16 projects the light beam modulated by the optical modulating means 14 onto a screen 17 so as to form an image on this screen 17.

The image signal supplied to the modulating means 14 is controlled by an image processing means 18 such as a personal computer or the like.

According to the present invention, since the structure of the SWS grating is set in the proper manner, the diffraction is effected depending on the polarization direction of the light beam incident thereon so as to produce a diffracted light with a predetermined diffraction order only. Both the diffractive optical element and the polarization converting element using this diffractive optical element can be realized which may be utilized in a similar manner to the polarization separation element having the thin-film structure.

In addition, according to the present invention, both the diffractive optical element and the polarization converting element using this diffractive optical element can be realized, which own the SWS grating structures manufactured under better conditions, also may perform the polarization separation operation.

What is claimed is:

1. A polarization converting element, comprising:
a periodic first blazed type grating portion and a periodic second blazed type grating portion which is arranged on a light exit side of the first blazed type grating portion, wherein
the first blazed type grating portion and the second blazed type grating portion are each formed by a plurality of grating sections, and a pair of grating sections corresponding to each other in each periodic first and second blazed type grating portions has the same period Pt, and
each of the grating sections forming at least one of the first blazed type grating portion and the second blazed type grating portion is formed by a sub-wavelength structure grating having a period p1 smaller than the period Pt, with the period p1 being smaller than a wavelength of a light beam used, and
wherein light beams are diffracted by the first blazed type grating portion and the second blazed type grating portion at a specific diffraction order, and
wherein said diffractive optical element is structured such that within an entire region of used wavelengths, diffraction directions are made different from each other, depending upon a polarization direction of a light beam incident on said diffractive optical element, and a diffracted light is concentrated only to one predetermined diffraction order, and
further comprising deflecting means provided so that an emergence direction of one of a P-polarized light beam and an S-polarized light beam which has undergone polarization-separation to be diffracted in a diffraction direction different depending on a polarization direction by said diffractive optical element is made substantially coincident with an emergence direction of the other beam.

2. A polarization converting element, comprising:
a periodic first blazed type grating portion and a periodic second blazed type grating portion which is arranged on a light exit side of the first blazed type grating portion, wherein
the first blazed type grating portion and the second blazed type grating portion are each formed by a plurality of grating sections, and a pair of grating sections corresponding to each other in each periodic first and second blazed type grating portions has the same period Pt, and
each of the grating sections forming at least one of the first blazed type grating portion and the second blazed type grating portion is formed by a sub-wavelength structure grating having a period p1 smaller than the period Pt, with the period p1 being smaller than a wavelength of a light beam used, and
wherein light beams are diffracted by the first blazed type grating portion and the second blazed type grating portion at a specific diffraction order, and
wherein said diffractive optical element is structured such that within an entire region of used wavelengths, diffraction directions are made different from each other, depending upon a polarization direction of a light beam incident on said diffractive optical element, and a diffracted light is concentrated only to one predetermined diffraction order, and
further comprising a half-wave plate provided in correspondence to one of a P-polarized light beam and an S-polarized light beam, which has undergone polarization-separation to be diffracted in a direction different depending upon polarization direction, by said diffractive optical element.

3. A polarization converting element, comprising:
a periodic first blazed type grating portion and a periodic second blazed type grating portion which is arranged on a light exit side of the first blazed type grating portion, wherein
the first blazed type grating portion and the second blazed type grating portion are each formed by a plurality of grating sections, and a pair of grating sections corresponding to each other in each periodic first and second blazed type grating portions has the same period Pt, and
each of the grating sections forming at least one of the first blazed type grating portion and the second blazed type grating portion is formed by a sub-wavelength structure grating having a period p1 smaller than the period Pt, with the period p1 being smaller than a wavelength of a light beam used, and
wherein light beams are diffracted by the first blazed type grating portion and the second blazed type grating portion at a specific diffraction order, and
wherein said diffractive optical element is structured such that within an entire region of used wavelengths, diffraction directions are made different from each other, depending upon a polarization direction of a light beam incident on said diffractive optical element, and a diffracted light is concentrated only to one predetermined diffraction order, and
further comprising deflecting means provided so that an emergence direction of one of a P-polarized light beam and an S-polarized light beam which has undergone polarization-separation to be diffracted in a diffraction direction different depending on a polarization direction by said diffractive optical element is made substantially coincident with an emergence direction of the other beam and a half-wave plate is provided in correspondence to one of the P-polarized light beam and S-polarized light beam.

4. A polarization converting element according to any one of claims 1 to 3, further comprising an optical member provided so that an incident direction of a light beam on said diffractive optical element is made substantially parallel to an emergence direction thereof.

5. A projection type display apparatus, in which a light beam which is emitted from a light source unit and contains an S-polarized light component and a P-polarized light component, is guided using the polarization converting element according to any one of claims 1 to 3 toward modulating means for modulating the light beam on the basis of an image signal and the light beam modulated by said modulating means is projected onto a predetermined surface by a projection optical system.

6. A projection type display apparatus according to claim 5, wherein said image signal is controlled in response to a signal supplied from an image processing means.

* * * * *

UNITED STATES PATENT AND TRADEMARK OFFICE
CERTIFICATE OF CORRECTION

PATENT NO. : 7,075,722 B2
APPLICATION NO. : 09/866587
DATED : July 11, 2006
INVENTOR(S) : Takehiko Nakai It is certified that error appears in the above-identified patent and that said Letters Patent is hereby corrected as shown below:

COLUMN 1:

Line 55, " "p1"," should read --"pl",--.
Line 56, "1 period "P1"" should read --1 period "pl"--.

COLUMN 2:

Line 8, "beames" should read --beams--.
Line 27, "alomost" should read --almost--.

COLUMN 5:

Line 50, "substiate" should read --substrate--.

COLUMN 6:

Line 28, " "P1"," should read --"pl",--.
Line 30, " "P1" " should read --"pl"-- and "F=f1/P1" should read --F=fl/pl--.
Line 41, " "p1" " should read --"pl"--.
Line 61, " "p1" " should read --"pl"--.
Line 64, " "p1" " should read --"pl"--.

COLUMN 7:

Line 6, "strucuture" should read --structure--.
Line 9, " "p1" " should read --"pl"--.
Line 12, " "p1" " should read --"pl"--.
Line 66, " "p1" " should read --"p1"--.

COLUMN 8:

Line 36, " "P1" " should read --"pl"--.
Line 37, "F=f1/P1" should read --F=fl/pl--.

COLUMN 9:

Line 56, "embodiment 1," should read --embodiment 4,--.

UNITED STATES PATENT AND TRADEMARK OFFICE
CERTIFICATE OF CORRECTION

PATENT NO. : 7,075,722 B2
APPLICATION NO. : 09/866587
DATED : July 11, 2006
INVENTOR(S) : Takehiko Nakai It is certified that error appears in the above-identified patent and that said Letters Patent is hereby corrected as shown below:

COLUMN 10:

Line 24, "beames," should read --beams,--.

COLUMN 11:

Line 48, "period p1" should read --period pl--.

COLUMN 12:

Line 15, "period p1" should read --period pl--.
    Line 48, "period p1" should read --period pl--.

Signed and Sealed this

Twentieth Day of November, 2007

JON W. DUDAS
*Director of the United States Patent and Trademark Office*